UNITED STATES PATENT OFFICE.

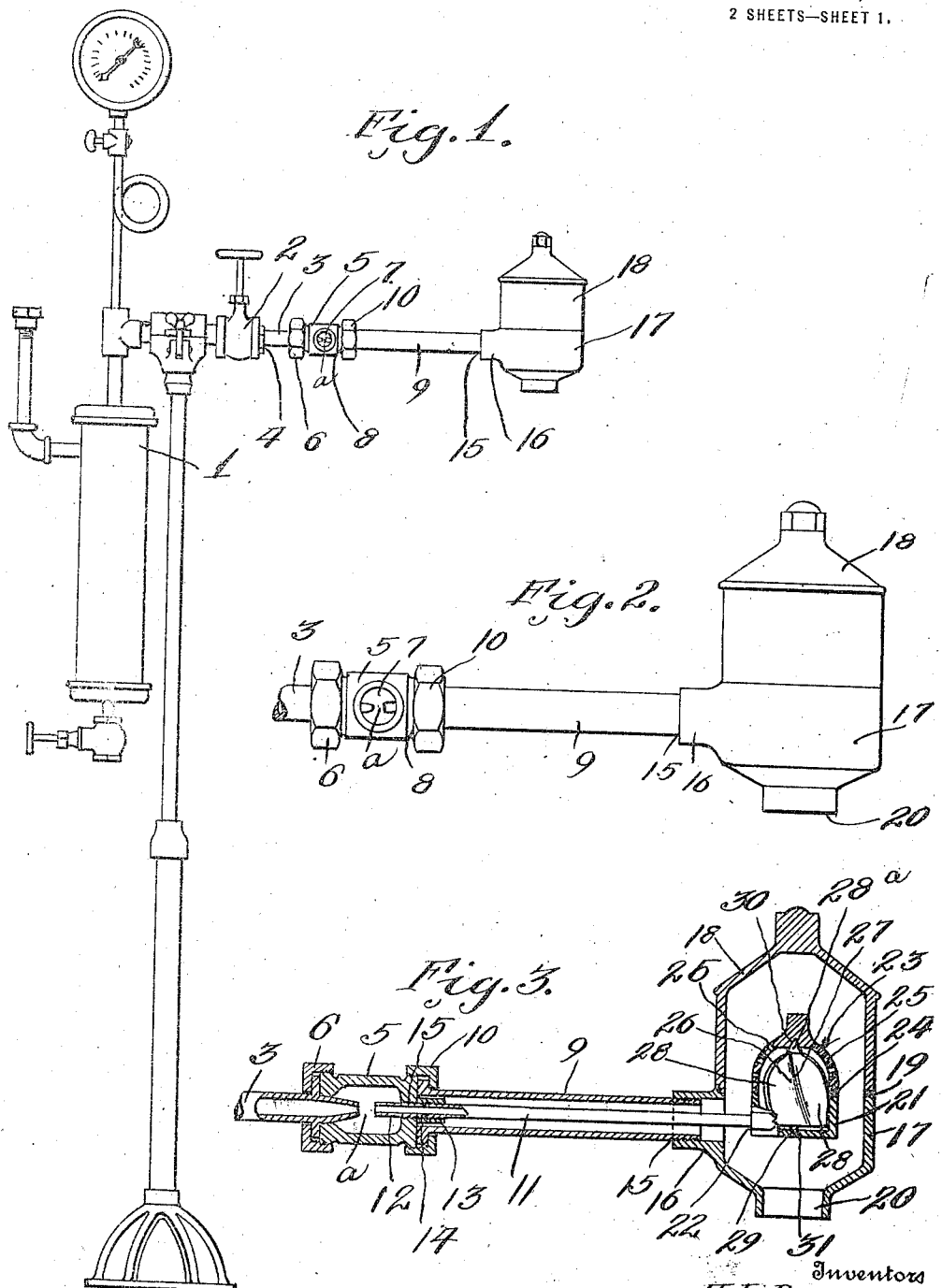

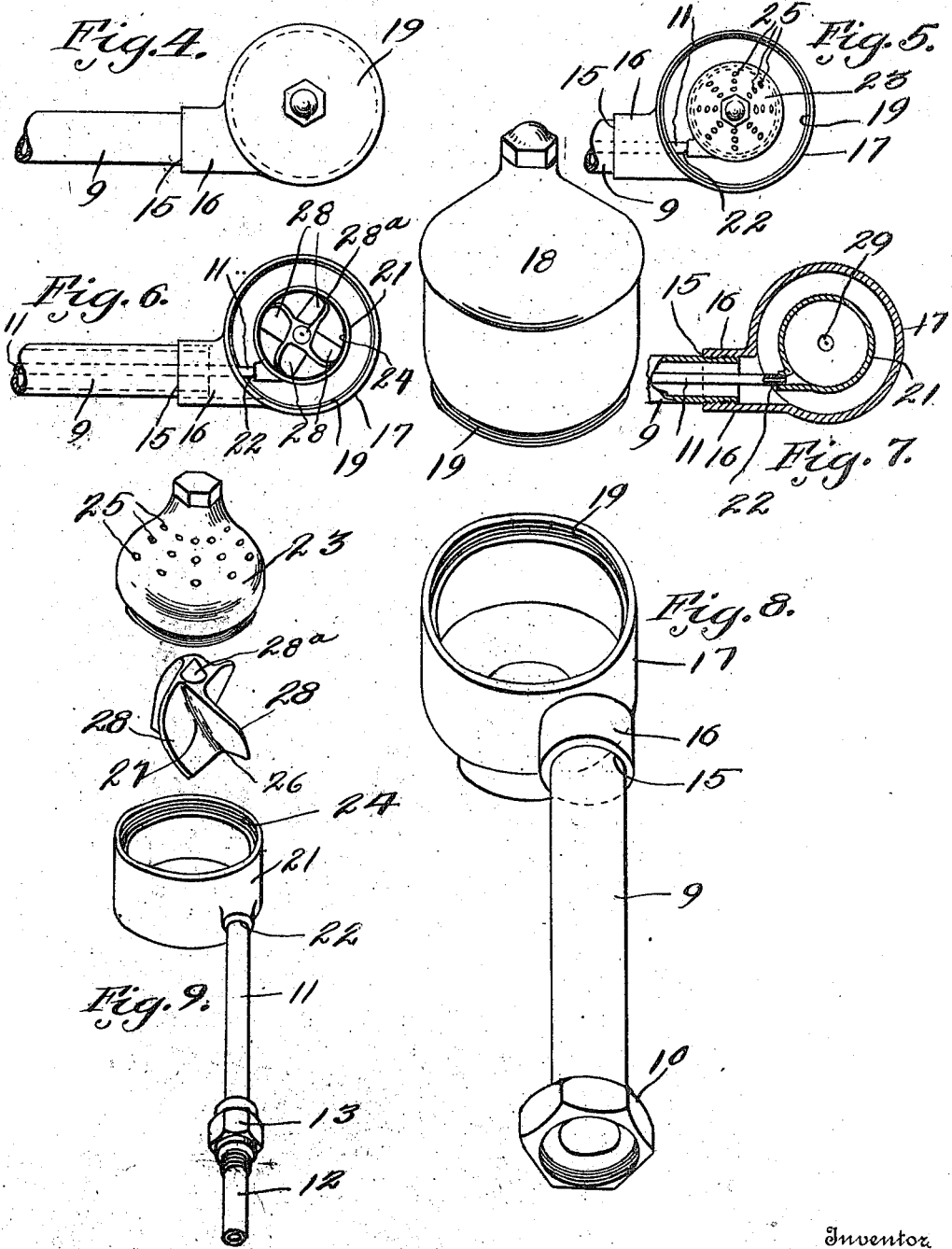

HARRY L. DRAPER, GUY HENRY, AND ELLES T. HENINGER, OF KOKOMO, INDIANA.

HOMOGENIZER OR EMULSIFIER.

1,177,236.     Specification of Letters Patent.     Patented Mar. 28, 1916.

Application filed March 20, 1915. Serial No. 15,924.

*To all whom it may concern:*

Be it known that we, HARRY L. DRAPER, GUY HENRY, and ELLES T. HENINGER, citizens of the United States, residing at Kokomo, in the county of Howard and State of Indiana, have invented a new and useful Homogenizer or Emulsifier; and we do hereby declare the following to be a full, clear, and exact description of the invention, such as will enable others skilled in the art to which it appertains to make and use the same.

This invention relates to an improved homogenizer, and an object of the invention is to provide a device of this nature, which is simple, efficient and practical in construction, and the cream from which will efficiently whip.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in side elevation showing the improved emulsifier as used in connection with an injector, whereby the butter, oil and milk may be drawn, from a heating vat and forced into the emulsifier. Fig. 2 is an enlarged elevation of the emulsifier detached from the injector. Fig. 3 is a sectional view through Fig. 2. Fig. 4 is a plan view of the emulsifier. Fig. 5 is a plan view showing the cover removed. Fig. 6 is a plan view, not only showing the cover removed, but also showing the perforated cap of the breaker box. Fig. 7 is a detail horizontal sectional view through the emulsifier. Fig. 8 shows collective views of the emulsifier casing and its cover. Fig. 9 illustrates collective views of the breaker box, the agitator fan and its perforated cap.

Referring more particularly to the drawings, 1 designates the usual or conventional form of compressed air tank, there being a valve 2 for controlling the discharge or disbursement of air power. A short pipe 3 connects at 4 to the casing of the valve 2, and in turn to the injector casing or fitting 5 by means of the cap 6. This fitting or injector casing is T-shaped as shown, and the part 7 thereof is designed to be connected by any suitable connections (not shown) to a suitable heating vat (not shown). The threaded end 8 of the fitting or injector casing 5 is connected to the tube 9 by means of the cap 10, and arranged in the interior of the tube 9 is an inner tube or conduit 11, which has an extension tube 12 connected thereto by the lock member or nut 13, the threads 14 of the extension engaging the interior threads 15 of one end of the fitting 5. The tube 9 is threaded at 15 into an extension 16 of the emulsifier casing 17, which is provided with a cover 18, connected to the casing by means of a thread 19, there being a suitable outlet opening 20 in the lower portion or part of said casing. Arranged upon the interior of the casing 17 is a breaker box or receptacle 21, into which one end of the inner tube 11 is threaded as shown at 22. The breaker box is provided with a cap 23 threaded to the box as shown at 24, which cap is provided with perforations 25. Arranged in the breaker box is a revoluble agitator fan 26, which comprises a body portion 27 and blades 28, which not only extend tangentially to the body, but are also curved spirally downwardly, so that when the material enters the breaker box with considerably great force, a revoluble motion is imparted to the agitating fan, thereby deflecting the combined materials or ingredients upwardly toward the cap, where they are forced through the perforations thereof, on to the inner circumference of the cover of the casing 17, the same gradually feeding through the outlet 20, into any suitable receptacle. The upper and lower portions of the body of the agitator fan are provided with conical projections 28$^a$ and 29, which engage correspondingly shaped seats or bearings 30 and 31 of the cap and the bottom of the breaker box. These conical projections engaging their seats constitute what may be termed "thrust bearings", so that the fan will whirl or revolve with great rapidity, owing to the force with which the material enters the breaker box. As before stated, the injector draws the butter, oil and milk out of a suitable heating vat (not shown), into the fitting 5, and siphons the same at the junction *a* through the inner tube 11 and into the breaker box, where it imparts motion to the fan.

The invention having been set forth, what is claimed as new and useful is:—

1. An emulsifier comprising a casing having an outlet, a breaker box supported within the casing and having a perforated cap, a whirling agitating fan having bearings in the cap and the bottom of the box.

2. An emulsifier comprising a casing having an outlet, a breaker box supported within the casing and having a perforated cap, a whirling agitating fan having bearings in the cap and the bottom of the box, and means for forcing solution ingredients into the breaker box to impart motion to the fan.

3. An emulsifier comprising a casing having a discharge opening, a breaker box supported therein having perforations in its upper portion or wall, a whirling agitating fan provided with tangentially disposed spiral blades, and means for forcing a solution into the breaker box and against said blades to impart motion to the fan.

In testimony whereof we have signed our names to this specification in the presence of two subscribing witnesses.

HARRY L. DRAPER.
   GUY HENRY.
   ELLES T. HENINGER.

Witnesses:
 JOSEPH C. HERRON,
 GOLDIE SNYDER.